United States Patent [19]

Meier-Maletz

[11] 3,822,064

[45] July 2, 1974

[54] RECORD PLAYER

[75] Inventor: Max Meier-Maletz, Dusseldorf, Germany

[73] Assignee: Intersound Ltd., Zug, Switzerland

[22] Filed: Apr. 19, 1972

[21] Appl. No.: 245,311

[30] Foreign Application Priority Data

Apr. 27, 1971 Germany .......................... 2120591

[52] U.S. Cl. ........................ 274/7, 274/9 R, 274/25

[51] Int. Cl. ........................ G11b 3/02, G11b 25/04

[58] Field of Search ............ 274/7, 9 R, 16, 25, 29, 274/1 R

[56] References Cited

UNITED STATES PATENTS

| | | | |
|---|---|---|---|
| 1,572,696 | 2/1926 | Vanderkamp | 274/16 |
| 2,859,974 | 11/1958 | Jauquet | 274/16 |
| 3,415,526 | 12/1968 | Wiener | 274/9 R |

*Primary Examiner*—Louis R. Prince
*Assistant Examiner*—Steven L. Stephan
*Attorney, Agent, or Firm*—James M. Heilman; William O. Heilman; Anthony J. Casella

[57] ABSTRACT

The invention relates to a manually driven record player consisting of a paperboard or cardboard cut-out which is divided into three portions by folding, of which one portion carries the needle at its outer edge, the middle portion acting as a resonance branch and the third portion having the record or disc rotatably arranged on it.

4 Claims, 14 Drawing Figures

RECORD PLAYER

The invention relates to a manually driven record player consisting of a paperboard or cardboard cut-out which is divided into three portions by folding, of which one portion carries the needle at its outer edge, the middle portion acting as a resonance branch and the third portion having the record or disc rotatably arranged on it.

Such record players are employed in particular for publicity purposes or for play-back of small discs. The portions of the paperboard cut-outs may be folded on to each other, in such a manner that the record player requires but little space for storage and transport.

In the case of a known record player of the kind defined in the foregoing, the portion constituting the resonance branch and the base portion carrying the disc or record are interconnected by a tension element, by means of which the portion constituting the resonance branch is drawn towards the disc, so that the portion carrying the needle at its outer edge is thrust towards the disc with the required force. A rubber ring which is hooked into appropriate incisions of the portion constituting the resonance branch and of the portion carrying the disc, is preferably employed as a tension element, being known for packaging purposes. The connection between the portion constituting the resonance branch and the portion of the paperboard or cardboard cut-out carrying the disc may consist of a strip or tongue.

It has been observed that this known coupling between the portions of the paperboard or cardboard cut-out carrying the disc and constituting the resonance branch engenders a disadvantageous tonal effect. Beyond this, the application of complementary elastic coupling elements such as rubber rings, and the punching-out of parts of the portions for the installing of the coupling element, are costly and onerous.

The invention is accordingly based on the problem of devising a record player of the kind defined initially, wherein the above mentioned disadvantages are eliminated. The present invention attempts to securing an optimum purity of sound with adequate sound volume, the means employed for this purpose being uncomplicated and inexpensive.

According to the present invention, there is a record player consisting of a paperboard or cardboard cut-out subdivided into three portions by folding, of which the one carries the needle at its outer edge, the middle portion acting as a resonance branch and the record or disc being rotatably arranged on the third portion, characterised in that the portion forming the resonance branch is joined at or near its one folding edge with its underside in areal contact to the upper side of the portion carrying the disc or record by means of bonding, welding or riveting, or of clips or staples or of a clamping strap.

Apart from the possibility of inexpensive production of a record player of this kind, the latter acquires the decisive advantage that the resonance branch forms an uninterrupted surface and that the sound volume and sound purity are increased by comparison to known record players. Beyond this, a part of the portion of the paperboard or carboard cut-out carrying the disc is also included in the resonating area, although the major part of this portion is pressed down by hand on to a plan support, e.g. a table top.

In a particularly advantageous form of embodiment of the record player according to the invention, the portion forming the resonance branch and the two outer portions of the cut-out are formed into a sound projector which is closed or almost closed at one end. This has the great advantage that the sound waves emerge from one end of the "trumpet" so formed, and that a greater sound volume is obtained with satisfactory purity of tone.

In further development of the invention, the portion forming the resonance branch consists of two cut-out sections forming a gap between them, the free edge of the section facing towards the disc in the operating position of the record player being glued, riveted or stapled to the portion carrying the disc. In this form of embodiment, the portion carrying the needle is partially cut out of the portion forming the resonance branch, to form a tab or lug.

Specific embodiments of the present invention will now be described, by way of examples, with reference to the accompanying drawings, in which.

Figure 2:
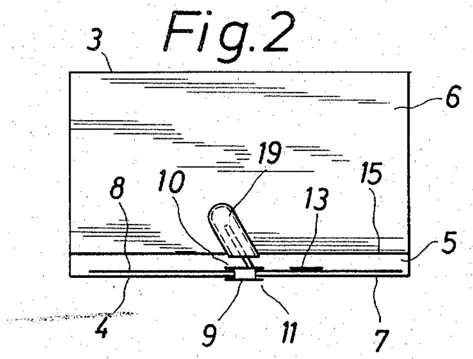
FIG. 2 shows a front view of the record player in its operating position which is formed by folding the cut-out according to FIG. 1.
Figure 4:
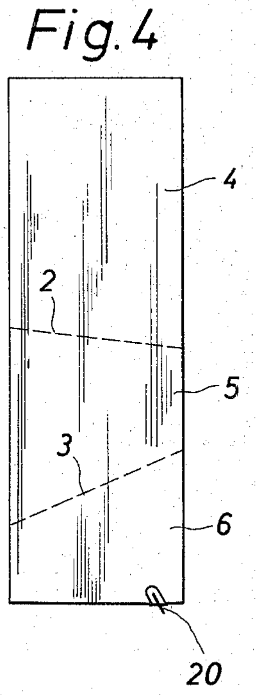
FIG. 4 shows a rectangular cut-out without a disc and with obliquely directed edge-forming folds.
Figure 5:
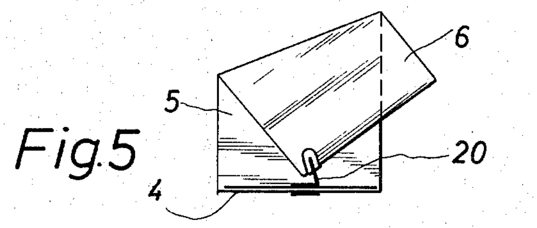
FIG. 5 shows the record player in its operating position, which is formed from the cut-out according the FIG. 4.
Figure 3:
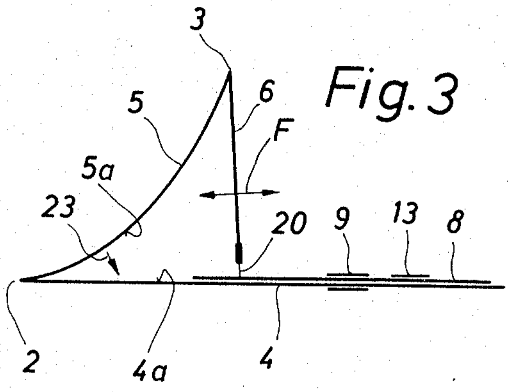
FIG. 3 shows a sideview of this record player in the operating position.

The cut-out 1 from which the record player illustrated in FIGS. 2 and 3 is formed, is subdivided into portions 4, 5, 6 by fold lines 2,3. The fold lines 2,3 are such as to form edges by folding the adjacent portions over through an angle of approximately 30° to 90°.

The portion 4 carries adjacent to the edge 7, the disc or record 8 which in known manner has a central bore and is rotatably connected to the portion 4 by means of a short annular sleeve 9 bearing upper and lower outwardly directed flanges 10,11. Within an area bounded by the spiral sound groove 12, the record or disc 8 bears another annular sleeve 13 which is equally equipped with upper and lower outwardly directed flanges which secure the sleeve 13 to the disc. Accordingly, the record may be rotated by appropriate rotary movement, applied by a fingertip inserted into the opening 14 of the sleeve 13.

An obliquely directed longitudinal slit 16 extending from the edge 15, is formed in the portion 6. A needle carrier 19 may thus be inserted into the slit 16 by means of the lateral flanges 17,18 bearing on the edges of the slit 16. The carrier 19 is held in the slit 16 by clamping action and carries the needle 20 whereof a free end projects beyond the edge 15 of the portion 6.

Figure 6:
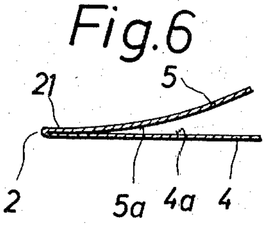
FIGS. 6, 8 and 10 are partial sideviews of different embodiments of the invention showing various connections between the portion forming the resonance branch and the portion carrying the disc.
Figure 7:
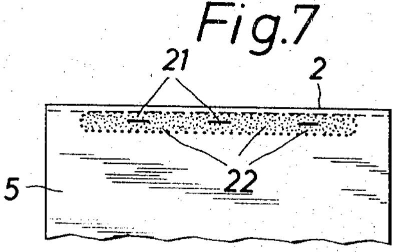

A record player, as apparent from FIGS. 2 and 3, is formed after folding the cut-out 1 along the fold lines 2,3. The portion 4 forms the base of the record player, the portion 5 forming a resonance branch and the portion 6 the carrying branch for the needle 20. Areas of the resonance branch 5 and the base part 4 are joined to each other, close to their common folding line 2. The joining means employed may be staples 21 as shown in FIGS. 6 and 7, by means of which the underside 5*a* of the portion 5 is joined together to the upper side 4*a* of the portion 4 close to the fold line 2 in the areas shown dotted in FIG. 7. This joins results, in a resiliently acting curvature of the portion 5, as apparent from FIG. 3, and the portion 5 forming the resonance branch also remaining free of discontinuities and incisions throughout its area, which appreciably improves the tone reproduction of the record player. Furthermore, a part of the portion 4 acts as a resonance element which also enhances the tonal quality of the record player.

The thrust acting in the direction of the arrow 23 presses the needle 20 carried on the portion 6 onto the disc 8, the portion 6 capable of oscillating about the folded edge 3 in the direction of the double-headed arrow F.

Figure 8:
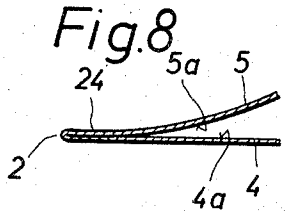
Figure 9:
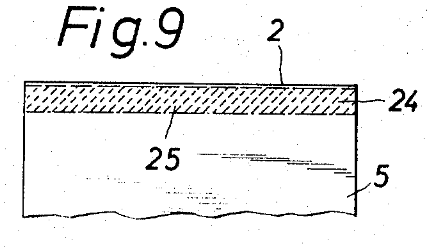
FIGS. 7 and 9 are partial plan views of the connections illustrated in FIGS. 6 and 8 respectively.

In the embodiment according to FIG. 8, the portion 4 forming the base element of the record player is joined to the portion 5, forming the resonance branch close to the folded edge 2 by means of a layer of adhesive 24, so that the underside 5*a* of the portion 5 is again joined to the upper side 4*a* of the portion 4 close to the folded edge 2 over an area 25 shown dotted in FIG. 9. In this embodiment, the portion 5 forming the resonance branch remains free of incisions and discontinuities, and is joined in areal contact to the portion 4 forming the base element as described in the aforementioned embodiment.

Figure 10:
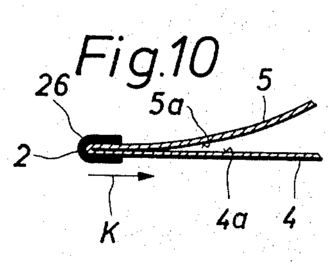

FIG. 10 illustrates another possible means of joining the underside 5*a* of the portion 5 to the upper side of the portion 4 by means of a U-section strap 26 which presses the two portions against each other in areal contact, close to the folded edge 2. The strap may have its branches or flanges glued to the portions, or may be removably pushed over these, so that the strap may optionally be removed. This embodiment has the advantage moreover that the strap may be pushed to a greater or lesser depth on to the portions 4,5 (arrow K in FIG. 10), and that the magnitude of the contact areas of the portions 4 and 5 may be varied thereby.

Figure 11:
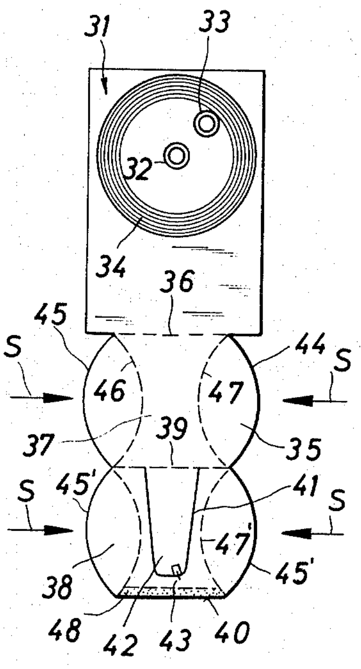
FIG. 11 shows another form of embodiment of a cut-out of cardboard or paperboard for production of a record player, wherein the resonance branch consists of two parts of said portion forming a gap between them.
Figure 12:
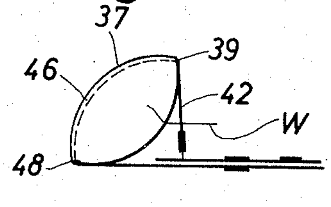
FIG. 12 shows the sideview of the record player produced from the cut-out according to FIG. 11.
Figure 13:
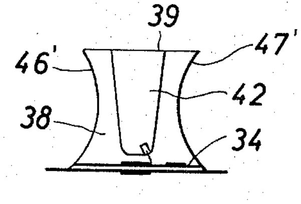
FIG. 13 shows the front view of the record player according to FIG. 12.

In the embodiment according to FIG. 11, the cut-out 31 again has a sleeve 32, for rotatable fastening of the disc record 34 on the portion 31 and a sleeve 33 for grasping the disc to turn the same. Adjacent the portion 31 is the portion 35 forming the resonance branch, said portion being partially defined by the folding line 36. Portion 35 is subdivided into equal halves 37,38 which may be folded with respect to each other along another folding line 39. An excision 41 producing a tab or lug 42, at whose extremity is situated the needle 43, extends from this folding line 39 in the direction of the edge 40. The two analogous parts 37,38 have curved outer edges 44,45 and 44′,45′, as well as curved folding lines 46,47 and 46′,47′. A record player illustrated in FIGS. 12 and 13 is formed by folding along the folding line 36, by further folding along the folding line 39 and moreover by lateral folding along the folding lines 46,47 and 46′,47′. Folding along the folding lines 46,47 and 46′,47′ occurs by pressing in the direction of the arrows S in FIG. 11, so that a resonance branch is formed from the two curved parts 35,38 with the lateral parts folded along the folding lines 46,47 and 46′,47′.

The part 38 bears an adhesive coating 48 at an edge 40 by means of which the part 38 of the portion 35 forming the resonance branch is joined close to the folding line 36 with the portion 31 forming the base element. The tab 42 formed by the excision 41 forms the third needle 43 carrying portion of the record player and is pivotable about the folding line 39 in the direction of the double headed arrow W (FIG. 12).

Figure 1:
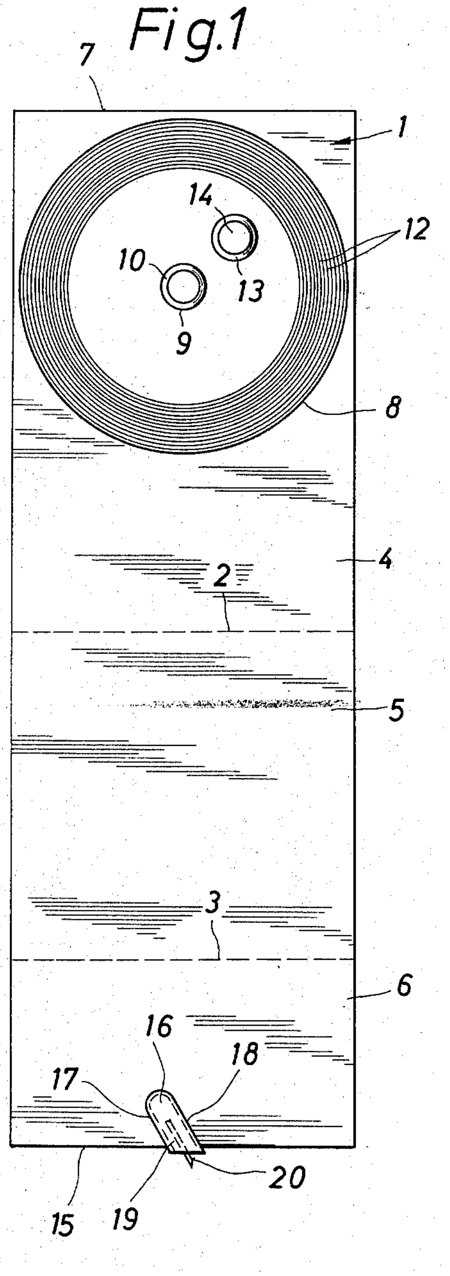
FIG. 1 shows a plan view of a rectangular paperboard or cardboard cut-out in one form of embodiment.
Figure 14:
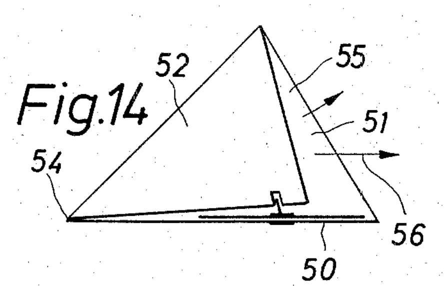
FIG. 14 shows a particularly advantageous form of embodiment of a record player, wherein the portion forming the resonance branch and the two outer portions of the cut-out form a sound projector open at one end.

FIG. 14 shows a particularly advantageous embodiment of the record player according to the invention. In the same, the portions incorporated are the base portion 50, a portion 51 forming the resonance branch, and a carrying portion 52 bearing the needle. The portions 50 and 51 are again connected at their common folding line in areal contact in the manner described in the foregoing. The portions 50,51,52 are so folded and formed that a record player shaped as a sound projector is formed which is closed at its one extremity at 54, and open at the side 55 only. The sound waves accordingly emerge from the record player at one side only, in the direction of the arrows 56. The form of embodiment according to FIG. 14 combines a satisfactory tonal quality with powerful volume and clear sound reproduction.

What we claim is:

1. A foldable phonograph reproducer comprising:

a. a sheet of flexible material including a first portion which forms a base;

b. means for rotatably carrying a phonograph record on said base portion;

c. a second portion of said sheet folded over said first portion to form a sound emitting surface d. retaining means positioned adjacent to the fold rigidly joining a first part of the second portion to said first portion for holding their surfaces inflexible near the fold, the remaining part of said second portion being flexed upon movement of the free end of said second portion away from said first portion, causing said remaining part of the second portion to assume the shape of a part of a cylindrical surface;

e. a third portion of said sheet folded along a line joining said second portion and said third portion to form a generally flat support; and f. a needle secured to the third portion adjacent to its edge for vibrating the third and second portions to create sound waves when the needle is vibrated by the sound groove on a rotating phonograph record.

2. A phonograph reproducer according to claim 1 wherein said needle is secured to the edge of the third portion by means of a needle carrier formed with two grooves which engage the edges of a slit cut in the edge of the third portion.

3. A phonograph reproducer according to claim 2 wherein the needle carrier is made of metal and rigidly supports the needle.

4. A phonograph reproducer according to claim 1 wherein the folds between said portions are parallel to each other.

* * * * *